United States Patent [19]

Faitel

[11] Patent Number: 5,058,487
[45] Date of Patent: Oct. 22, 1991

[54] CYLINDER WITH RADIALLY MOVABLE ROD

[75] Inventor: William M. Faitel, Oxford, Mich.

[73] Assignee: Litton Industrial Automation Systems, Inc., Florence, Ky.

[21] Appl. No.: 517,260

[22] Filed: May 1, 1990

[51] Int. Cl.⁵ .............................................. F16J 15/18
[52] U.S. Cl. .................................. 92/167; 92/165 R; 92/168; 92/240; 92/245; 277/27; 277/71; 277/72 R; 277/205; 277/188 R; 277/188 A
[58] Field of Search ............... 92/167, 165 R, 168, 92/240, 245; 277/27, 71, 72 R, 205, 188 R, 188 A, 58

[56] References Cited

U.S. PATENT DOCUMENTS

| | | | |
|---|---|---|---|
| 1,448,624 | 3/1923 | Gordon | 92/240 |
| 2,081,040 | 5/1937 | King | 277/205 |
| 2,273,129 | 2/1942 | Messinger | 277/205 |
| 2,509,436 | 5/1950 | Isenbarger | 277/188 R |
| 3,030,118 | 4/1962 | Groce | 277/72 |
| 3,207,524 | 9/1965 | Trbovich | 277/205 |
| 3,540,745 | 11/1970 | Flock | 277/205 |
| 3,913,460 | 10/1975 | Wright | 277/205 X |
| 4,169,605 | 10/1979 | Nishimoto et al. | 277/188 A |
| 4,211,150 | 7/1980 | Framberg | 92/167 X |
| 4,252,352 | 2/1981 | Scannell | 277/205 X |
| 4,886,241 | 12/1989 | Davis et al. | 277/188 A |
| 4,924,759 | 5/1990 | Plummer | 92/240 |
| 4,944,215 | 7/1990 | Nimmo | 92/130 R X |
| 4,971,337 | 11/1990 | Hufford | 277/85 |
| 4,973,063 | 11/1990 | Korenbilt | 277/57 |

FOREIGN PATENT DOCUMENTS

| | | | |
|---|---|---|---|
| 576594 | 6/1959 | Canada | 277/188 R |
| 3233854 | 3/1984 | Fed. Rep. of Germany | 92/245 |
| 437711 | 9/1948 | Italy | 277/188 A |
| 123751 | 10/1978 | Japan | 277/205 |

OTHER PUBLICATIONS

Chicago Belting Company, Handbook on Hydraulic and Pneumatic Leather Packings.

Primary Examiner—Edward K. Look
Assistant Examiner—Todd Mattingly
Attorney, Agent, or Firm—Barnes, Kisselle, Raisch, Choate, Whittemore & Hulbert

[57] ABSTRACT

A cylinder having a radially movable or pivoting rod slidably received in a floating gland disposed in a cavity or recess in an end cap of the cylinder. Preferably, seals are provided between the rod, gland and recess. Hence, the rod and gland can move radially while a fluid tight seal is maintained between the atmosphere and the interior of the cylinder to retain pressurized fluid therein. Preferably, to facilitate radial movement of the rod and hence the gland in the recess, the forces on opposed faces of the gland are equalized by an appropriate arrangement of seals to define equal surface areas on the opposed faces both of which communicate with the interior of the cylinder.

16 Claims, 2 Drawing Sheets 5,058,487

CYLINDER WITH RADIALLY MOVABLE ROD

FIELD OF THE INVENTION

This invention relates to gas or fluid actuated cylinders and more particularly to cylinders with rods accommodating misalignment such as in counterbalance devices.

BACKGROUND

Counterbalance devices are used in weight lifting operations to oppose a load, weight or force For example, in a sheet metal stamping press, it is necessary to move a platen and the die and tooling thereon which depending on its size and design, usually weighs about 5,000 pounds to 25,000 pounds. The platen and die and tooling is raised and lowered usually through a distance of 18" to 24", and at a relatively rapid rate of one to two seconds per cycle The counterbalance reduces, usually by 80% to 90% the power required to rapidly move this load which, without a counterbalance, typically would be about 100 to 300 horsepower.

A counterbalance system provides a source of potential energy which is utilized to counteract gravity acting on the movable platen, and the die and tool secured to it. Usually, the counterbalance system has a surge tank connected to one or more air cylinders, and preferably an air regulator to control and maintain the desired pressure of the compressed gas or other fluid in the system. The surge tank has sufficient volume so that as the cylinders are cycled, the pressure of the gas in the system does not change dramatically due to varying the effective volume of the cylinders. The cylinders convert the pressurized gas into a force which opposes the weight or effect of gravity on the movable platen and the die and tooling secured to it. Each cylinder is of conventional design with a piston and a rod slidably received in a head or cap. The rod is slidably received in a bearing and a seal assembly rigidly carried by the head.

The load is lifted or carried by the rod in a manner requiring the axis of the rod to be parallel and essentially coincident with the path of movement of the load In case of improper alignment, the rod may be bent, the piston may be tilted or cocked and thereby damage the piston, seals or interior surface of the cylinder wall, and/or the radial loading on the various cylinder parts may produce rapid wear and a short useful life.

Typically, to avoid such damage, a gimbal device is used to permit the cylinder to align itself and hence the rod with the path of movement of the load which is operably connected to the rod by the counterbalancing device Gimbals, for this application, are complex and expensive. Moreover, flexible rubber hoses are required to supply compressed air or other actuating fluid to the cylinder.

SUMMARY OF THE INVENTION

A cylinder having a radially movable or pivoting rod which is preferably slidably received in a floating gland in a cavity or recess of an end cap of the cylinder. Preferably, seals are provided between the rod, gland and recess. The gland, and hence the rod, is thereby permitted to move radially within the recess while a fluid tight seal is maintained between the atmosphere and the interior of the cylinder to retain pressurized fluid therein.

Preferably, to facilitate radial movement of the rod and gland in the recess, the forces on the opposed faces of the gland are equalized preferably by an appropriate arrangement of seals to define equal surface areas on the opposed faces, both of which communicate with the interior of the cylinder.

Objects, features and advantages of this invention are to provide a fluid actuated cylinder which accommodates misalignment of the load with the cylinder, compensates for such misalignment while permitting the body of the cylinder to be rigidly mounted, enables actuating fluid to be supplied to the cylinder through conventional rigid conduits, eliminates the need for precise alignment of the load with the axis of the cylinder, is of relatively simple design and economical manufacture and assembly, has a long service life and is relatively maintenance free.

BRIEF DESCRIPTION OF THE DRAWINGS

These and other objects, features and advantages of this invention will be apparent from the following detailed description, appended claims and accompanying drawings in which:

DETAILED DESCRIPTION OF THE PREFERRED EMBODIMENT

Figure 1:
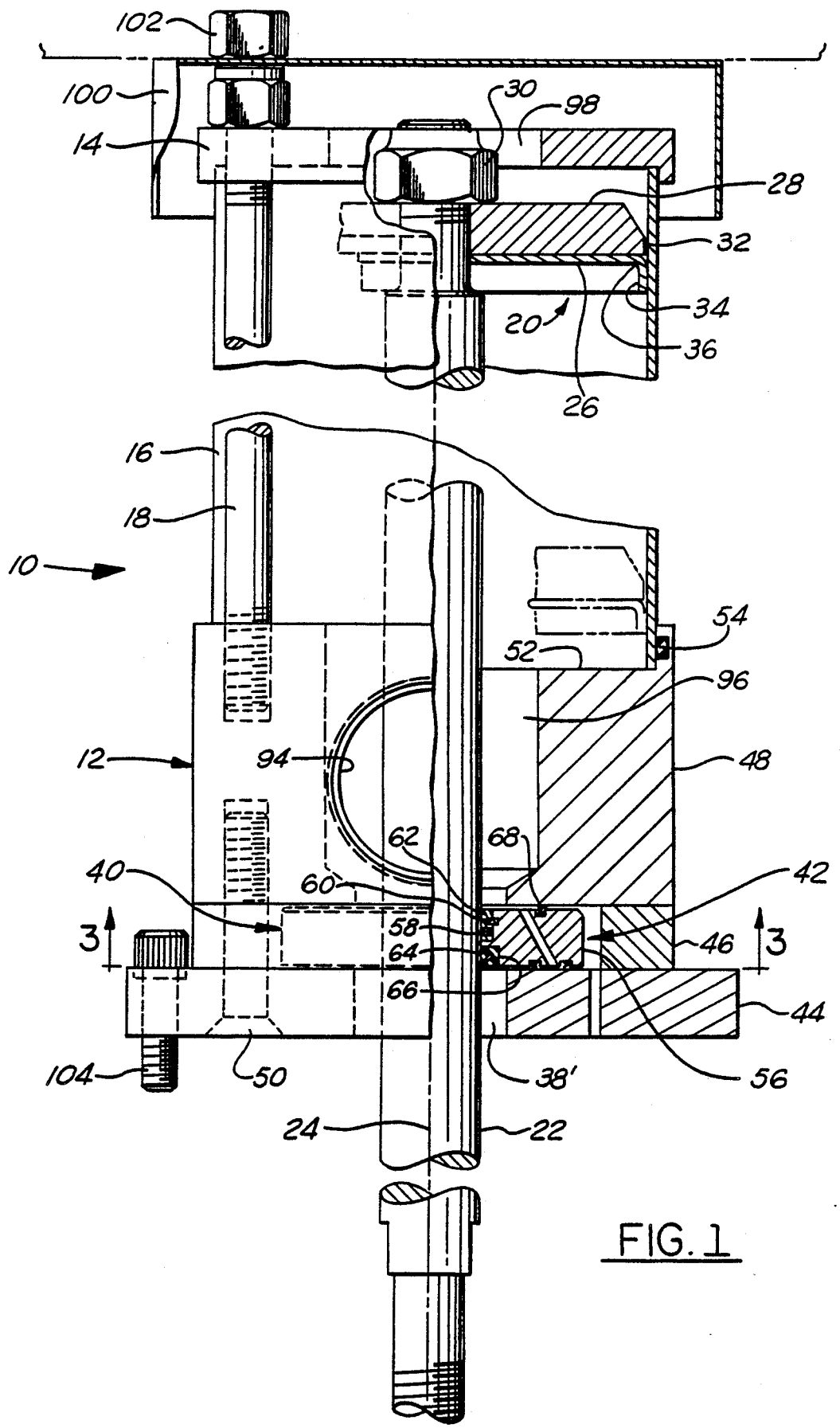
FIG. 1 is a fragmentary side view, partially in section, of a cylinder which embodies the invention.
Figure 2:
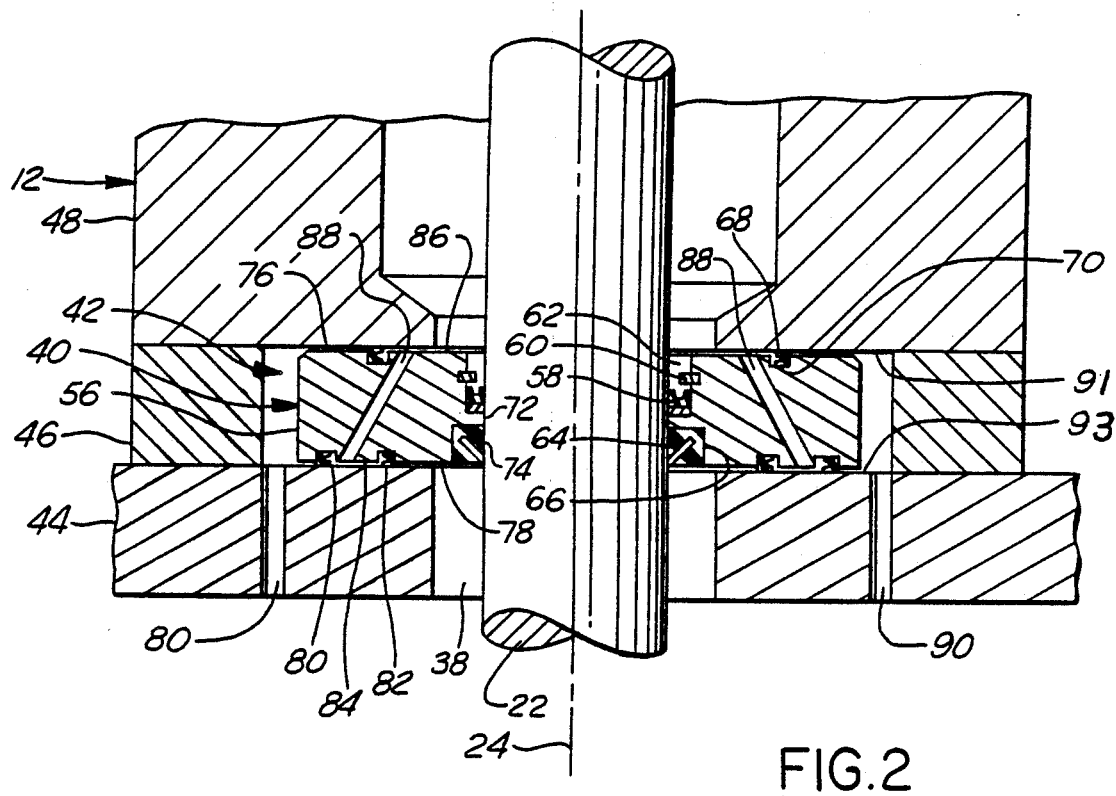
FIG. 2 is a fragmentary and enlarged sectional side view at the rod end of the cylinder of FIG. 1.
Figure 3:
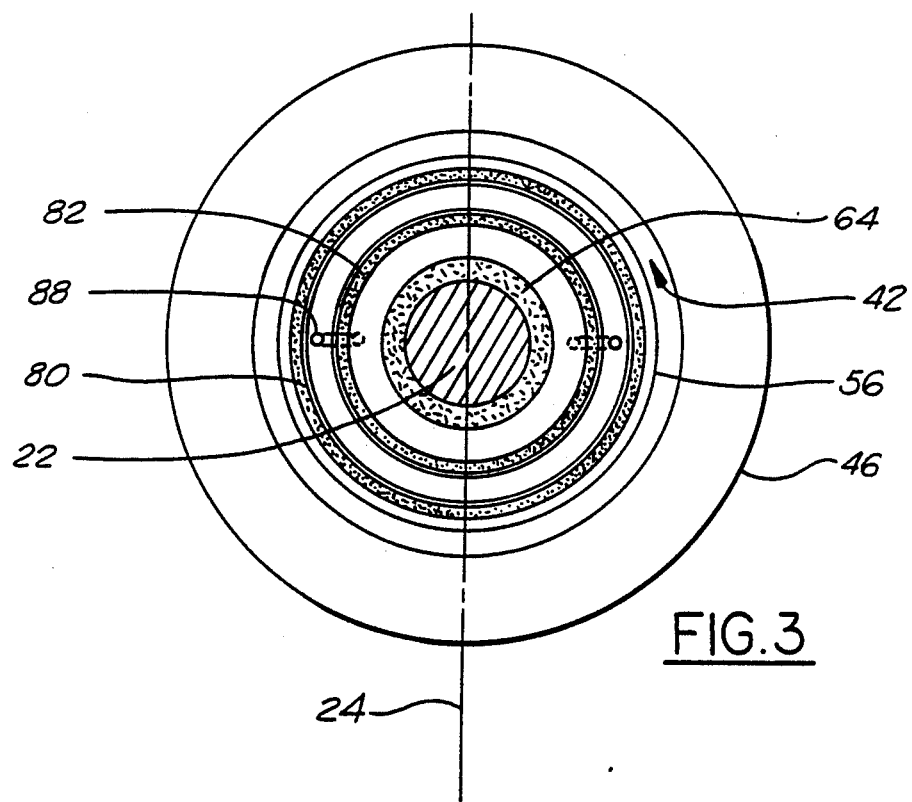
FIG. 3 is a sectional view taken along line 3—3 of FIG. 1.

FIG. 1 illustrates a pneumatic cylinder 10 embodying this invention with end caps 12 and 14 secured on the opposed ends of a barrel 16 by four tie rods 18, only one of which is shown. A piston 20 is slidably received in the barrel and connected to an actuator rod 22 which extends through the end cap 12.

In accordance with this invention, the actuator rod 22 can pivot within predetermined limits relative to the centerline 24 of the barrel to compensate for misalignment with the centerline of the path of movement of the load coupled to the rod. Preferably, the piston has a leather seal 26 and a metal backing disc 28 which are retained on the rod by a nut 30. In normal operation, to prevent contact of the disc with the barrel, preferably the maximum diameter of the disc is sufficiently smaller than the inside diameter of the barrel to provide clearance therebetween even when the disc is cocked by radial shifting of the rod. Typically, a clearance of about 1/16 to ⅛ of an inch or a smaller diameter by about ⅛ to ¼ of an inch is sufficient.

To facilitate pivoting of the rod, preferably the piston has a relatively short axial thickness adjacent the barrel. The axial extent of the piston adjacent the barrel is usually less than 1¼ of an inch and often less than 1 inch. Typically, the disc has a nominal axial thickness of about ½ inch and about ¼ inch immediately adjacent its peripheral edge 32, and the lip 34 of the seal has an axial extent of about ⅜ of an inch. With this arrangement, as the rod pivots, the lip of the seal remains in contact with the barrel and flexes near the bend 36 between the lip and the main body of the seal without the backing plate contacting or bearing on the barrel.

To provide clearance for the rod as it pivots, the cap 12 has a central through hole 38 with a minimum inside diameter substantially larger than the maximum outside diameter of the rod. To provide a seal while still permitting the rod to move radially and axially, a floating gland assembly 40 is received in a cavity or recess 42 which opens generally radially into the central hole 38 through which the rod passes. Preferably, the recess is defined by the cooperation of a cover plate 44, spacer ring 46 and body 48 which are secured together by cap screws 50. An end of the barrel 16 is received in a counterbore 52 in the body and a seal is provided between them by an O-ring 54 received in a groove in the body. The body is retained on the barrel by the tie rods 18 which are threaded into the body.

A fluid tight seal is provided between the rod and a carrier ring 56 of the gland assembly by a seal 58 retained by a snap ring 60 in a counterbore 62 in the carrier ring. To clean the rod and retain lubricant in the cylinder, a rod scraper 64 is received in a counterbore 66 in the ring. To provide a fluid tight seal between the carrier ring and the body 48 of the cap, a seal 68 is received in an annular groove 70 in the ring. To prevent damage to the seal and scraper, when the rod is shifted radially, a center bore 72 through a central web 74 of the ring is only slightly larger than the diameter of the rod. Thus, when the rod is shifted radially, most of the force for moving the gland assembly will be transmitted to the ring directly through the web 74 without significantly compressing or distorting the seal and scraper.

To permit the rod and carrier ring 56 to shift radially around their entire periphery, the maximum outside diameter of the carrier ring is smaller than the minimum inside diameter of the spacer ring 46. Preferably, the maximum extent to which the rod can be shifted radially from the cylinder centerline 24 is limited by the gland carrier ring 56 bearing on the spacer ring 46. Preferably, the hole 38 though the cover plate 44 and body 48 is large enough to provide clearance so that when the rod is shifted to its maximum radial extent, it does not contact or bear on the cover plate or body. However, if desired, the maximum extent to which the rod can be shifted radially can be limited by the rod engaging the cover plate 44 and/or body 48. Preferably, a bushing of brass, bronze or other suitable material may be disposed in the plate or body to prevent scratching on the rod surface when engaging it. Preferably, to provide axial clearance between the carrier ring 56 and the cover plate 44 and body 48, the axial thickness of the spacer ring 46 is greater than the axial thickness of the carrier ring. If desired, a plurality of stacked spacer rings can be utilized in lieu of the single spacer ring 46.

In accordance with another feature of this invention, preferably the resistance provided by the gland assembly 40 to the radial movement of the rod is minimized by balancing the forces acting on the opposed faces 76 & 78 of the gland ring. This is achieved by applying the pressurized fluid in the cylinder to at least substantially equal areas on the opposed faces of the gland ring. Thus, a pair of spaced apart annular seals 80 & 82 of different diameters are disposed in grooves in the face 78 of the gland ring to define a first annular area 84 which is equal to a second annular area 86 on the opposed face 76 of the ring which lies between the rod and the seal 68. These two areas communicate with each other and hence pressurized fluid in the cylinder through at least one passage 88 in the gland ring. To insure that these seals are not subjected to a significant back pressure when the rod is shifted radially, preferably the portion of the recess 42 disposed radially outwardly of the gland ring is bled to the atmosphere through one or more ports 90 in the cover plate.

To minimize the frictional resistance to movement of the gland assembly and increase the useful life of the seals, preferably the faces 91 & 92 of the cap body and cover plate contacted by the seals have a smooth or high quality surface finish with a roughness of less than 50 microns, desirably less than 25 microns, and preferably about 10 to 20 microns, and the sealing elements of the seals are of a low friction and abrasion resistant material. A suitable wear and abrasion resistant material for the sealing elements is sold under the Trademark "TURCITE B SLYDWAY HP" by the Shamban Bearing Division of W. S. Shamban & Co., of 711 Mitchell Road, Newberry Park, Calif. 91320. Preferably, to avoid corrosion, the gland ring 56 is a bronze, aluminum, steel treated to avoid rusting, or other corrosion resistant material.

If desired, the carrier ring 56 could be provided with flat smooth faces with a high quality surface finish and the seals 68 and 82 & 84 disposed in grooves in the body 48 and cover plate 44 respectively. To insure proper sealing, the seals 68 and 82 must be of sufficient diameter so that when the rod 22 is shifted to its maximum radial extent from the centerline 24, these seals are disposed completely outside of the bore 38 through the cover plate 44 and body 48. Thus, the diameter of these seals must be greater than the diameter of the bore 38 plus the difference between the diameter of the rod 22 and the bore 38.

Preferably, these seals 68, 80 and 82 have an annular flexible sealing element with a U shaped cross section arranged so that the free edges of their legs are urged into sealing engagement with the gland ring and recess walls by pressurized fluid in the cylinder. Appropriate seals for this application are commercially available under the trade name "American Variseal" from the Shamban Bearing Division of W. S. Shamban & Co.

In accordance with another feature of this invention, to minimize the back pressure to which the piston is subjected while moving, the cylinder has large fluid inlets and outlets. Preferably, this back pressure does not increase by more than 3% or about 2 PSI as the piston is moved. If the back pressure is not minimized, considerable energy is wasted moving fluid through the inlets and outlets. Moreover, the inlets and outlets are heated to an undesirably high temperature due to rapid movement of the fluid. For cylinders having a piston diameter of at least 5 inches, a stroke of 18 to 24 inches and operating at a rate of 30 to 60 cycles per minute, excess back pressure can be avoided by providing fluid inlets and outlets having a minimum cross sectional area of at least 3.0 square inches. Thus, the port 94 and passage 96 in the cap body 48, for admitting compressed fluid to the cylinder to retract the piston and rod and exhausting such fluid to permit the rod to be extended by the load applied to it, are much larger in cross section than in conventional cylinders. Similarly, the other side of the piston communicates with the atmosphere through a very large or oversized passage 98 through the end cap 14.

To further decrease the likelihood of contaminants being drawn into the back end of the cylinder as the piston and rod are extended, preferably a pan-shaped shield 100 is disposed over and spaced from the rear end cap to provide a curved or sinuous path for air drawn into the back of the cylinder as the piston is extended. This shield is mounted on the cylinder by retainer nuts 102 secured to the tie rods.

Typically, in a device providing a counterbalance to the load or weight of a platen and associated tooling in a stamping press, the cylinder 10 is oriented so that when the load is operably connected to the rod 22, the weight or mass of the load will move the piston 20 and rod to its extended position when no pressurized fluid is applied to the cylinder. For example, the cylinder 10 may be rigidly mounted generally in the orientation shown in FIG. 1 with the axis 24 of the cylinder extending vertically and the load of the workpiece tending to move the piston and rod downwardly to its extended position (shown in phantom in FIG. 1). The cylinder can be mounted in this position by securing the cover plate 44 to a fixed support (not shown) by cap screws 104. Since the body of the cylinder is mounted in a fixed position, a rigid conduit or pipe can be connected to the port 94 to supply a fluid under pressure, such as compressed gas, to the interior of the cylinder. When the compressed gas is admitted to the cylinder, it will urge the piston and rod toward its fully retracted position, as shown in FIG. 1, to thereby counterbalance the weight or mass of the workpiece. This counterbalancing force can be reduced or eliminated by exhausting the compressed gas in the cylinder through the port 94. Normally, when the compressed gas is exhausted, the piston and rod are returned to their extended position adjacent the head end of the cylinder, as shown in phantom in FIG. 1, by the weight or load of the workpiece applied to the rod. When in operation in a counterbalance system the port 94 will communicate with a surge tank and the piston will be disposed between its fully extended and retracted positions and be subjected to sufficient gas pressure to just balance or counteract the load applied to the rod.

Since in cylinder 10, the rod 22 can pivot and shift radially relative to the axis 24 of the cylinder, it will accommodate misalignment of the path of travel of the workpiece with the axis of the cylinder without any adverse consequences to the function and operation of the cylinder or its in service useful life.

In practice, a counterbalance cylinder 10 embodying this invention has been tested for more than 1,380,000 cycles without any excessive wear or adverse operation of the cylinder. The apparatus for performing this test included a stand having a frame on which the cylinder 10 was rigidly mounted. A 1000 lb. weight was hung from the rod 22, and a lever was attached to the weight and frame to cause the load to oscillate radially in all directions from the axis 24 approximately ¾ of an inch. The cylinder had a 5 inch bore, an 18 inch stroke and was pressurized at 50 psig to lift the weight. The lift time was approximately 1 second. A counter was incorporated to count each time the cylinder was raised indicating one cycle.

After 1,383,747 cycles the cylinder was disassembled and inspected. Upon disassembly, the gland assembly 40 and its seals showed no sign of premature wear. The piston and rod showed no indication of wear. The rod showed characteristic signs of polishing consistent with this type of application.

It will be apparent that this invention can be embodied in various types and modifications of fluid actuated rams or cylinders such as in cylinders adapted for applying an actuating fluid to the other face or both faces of the piston. For example, actuating fluid could be applied from the other end of the cylinder 10 by substituting an appropriately ported end cap for the cap 14 and flipping over the leather seal 26 and backing plate 28 or otherwise providing an appropriate seal between the piston 20 and the barrel. This would permit actuating fluid to be admitted and discharged from the other end of the cylinder.

I claim:

1. A fluid actuated device comprising; a barrel, a piston slidably received in said barrel, an elongated rod connected to said piston for movement therewith, and extending generally axially through one end of said barrel, a cap sealingly connected to said one end of said barrel and having a central hole through which said rod extends, said central hole being larger than the diameter of said rod so that said rod can be shifted generally radially in all directions within predetermined limits relative to said cap, a recess in said cap which opens into said hole and extends generally radially outwardly thereof around the entire periphery of said hole, a gland disposed in said recess and having a hole through which said rod extends, said gland having a maximum radial extent less than the maximum radial extent of said recess so that said gland can shift generally radially in said cap relative to said central hole through said cap, a first seal disposed between said rod and said gland to provide a fluid tight seal therebetween while permitting said rod to move generally axially relative to said gland, a second seal disposed in said recess between said top and said gland and constructed and arranged to provide a seal preventing fluid under pressure within said cylinder from flowing by said gland while permitting said gland to move generally radially in said recess relative to said cap, whereby said rod can move both generally axially and generally radially within predetermined limits relative to said cap to facilitate alignment of the end of said rod distal from said piston with the path of travel of a load operably connected to said distal end of said rod, said first and second seals being annular, having differing diameters and defining a first annular area on a first side of said gland which communicates with the interior of said barrel, third and fourth annular seals of differing diameters which define a second annular area on a second side of said gland which is generally opposed to said first side thereof, and at least one passage through said gland communicating said second area with the interior of said barrel.

2. The device of claim 1 further comprising, said first and second areas being approximately equal to thereby approximately equalize the pressure forces on said first and second sides of said gland.

3. The device of claim 1 further comprising a vent passage in said cap which communicates with the atmosphere and with said recess radially outward of said seals.

4. The device of claim 1 comprising a ring disposed between said gland and said rod and constructed and arranged so that said rod bears upon said ring to shift said gland.

5. The device of claim 1 further comprising said cap having a body, a cover and a spacer between them forming said recess.

6. The device of claim 1 wherein each of said second, third and fourth gland seals has a flexible annular sealing element having in cross section a generally U-shape with legs constructed and arranged so their free edges are biased into sealing engagement by the pressurized fluid in the barrel which actuates the piston.

7. The device of claim 1 wherein said gland is of a material which comprises at least one of bronze, aluminum, steel, alloys of bronze, alloys of aluminum, and alloys of steel treated to provide corrosion resistance.

8. The device of claim 1 wherein said recess comprises first and second opposed surfaces which are finished to a surface roughness of no more than 50 microns.

9. The device of claim 8 wherein said surfaces are finished to a surface roughness of no more than 25 microns.

10. The device of claim 8 wherein said surfaces are finished to a surface roughness in the range of 10 to 20 microns.

11. The device of claim 1 wherein said piston is relatively short and has a flexible seal carried by the piston and providing a fluid tight seal between said piston and said barrel.

12. The device of claim 11 wherein said seal is of leather.

13. The device of claim 1 wherein said cylinder comprises a second end having sinuous fluid passages.

14. The device of claim 1 wherein said cylinder is at least 5 inches in diameter and has at least one fluid port with a cross sectional area of at least 3 square inches.

15. The device of claim 1 wherein said piston comprises a disc having a maximum diameter less than the inside diameter of said cylinder and a peripheral edge with an axial extent of not more than about ½ inch and a flexible seal associated with said disc and preventing pressurized fluid in said cylinder from leaking past said piston.

16. The device of claim 1 wherein said piston adjacent the periphery has an axial extent of not more than about 1¼ inches.

* * * * *